United States Patent [19]
Lisimaque et al.

[11] Patent Number: 5,477,039
[45] Date of Patent: Dec. 19, 1995

[54] METHOD AND DEVICE TO INCREASE THE PROTECTION OF A CHIP CARD

[75] Inventors: Gilles Lisimaque, Potomac, Md.; François Geronimi, Aix En Provence, France

[73] Assignee: Gemplus Card International, Gemenos, France

[21] Appl. No.: 165,869

[22] Filed: Dec. 14, 1993

Related U.S. Application Data

[63] Continuation of Ser. No. 773,448, Oct. 9, 1991, abandoned.

[30] Foreign Application Priority Data

Oct. 9, 1990 [FR] France ................................ 90 12440

[51] Int. Cl.⁶ .......................... G06K 5/00; G06K 19/06
[52] U.S. Cl. ...................... 235/380; 235/382; 235/492
[58] Field of Search ...................................... 235/492, 493, 235/494, 380, 382, 382.5

[56] References Cited

U.S. PATENT DOCUMENTS 4,471,216  9/1984  Herve ....................... 235/380
4,870,574  9/1989  Lisisimaque ................ 364/300

FOREIGN PATENT DOCUMENTS 0243873  11/1987  European Pat. Off. .
0314148  5/1989  European Pat. Off. .
8802899  4/1988  WIPO .

Primary Examiner—Timothy P. Callahan
Assistant Examiner—Trong Phan
Attorney, Agent, or Firm—Nilles & Nilles

[57] ABSTRACT

The method is designed to increase the protection of a microcircuit-based memory card comprising at least one memory coupled to a data-processing element. When said data-processing element receives a command by a data signal external to the card, said method consists in making said data-processing element emit a ratification signal at an instant that is deferred, with respect to the instant at which its emission was prompted by the data signal, by a duration that is randomly variable in time. The disclosed method can be applied to microcircuit-based memory cards.

8 Claims, 2 Drawing Sheets

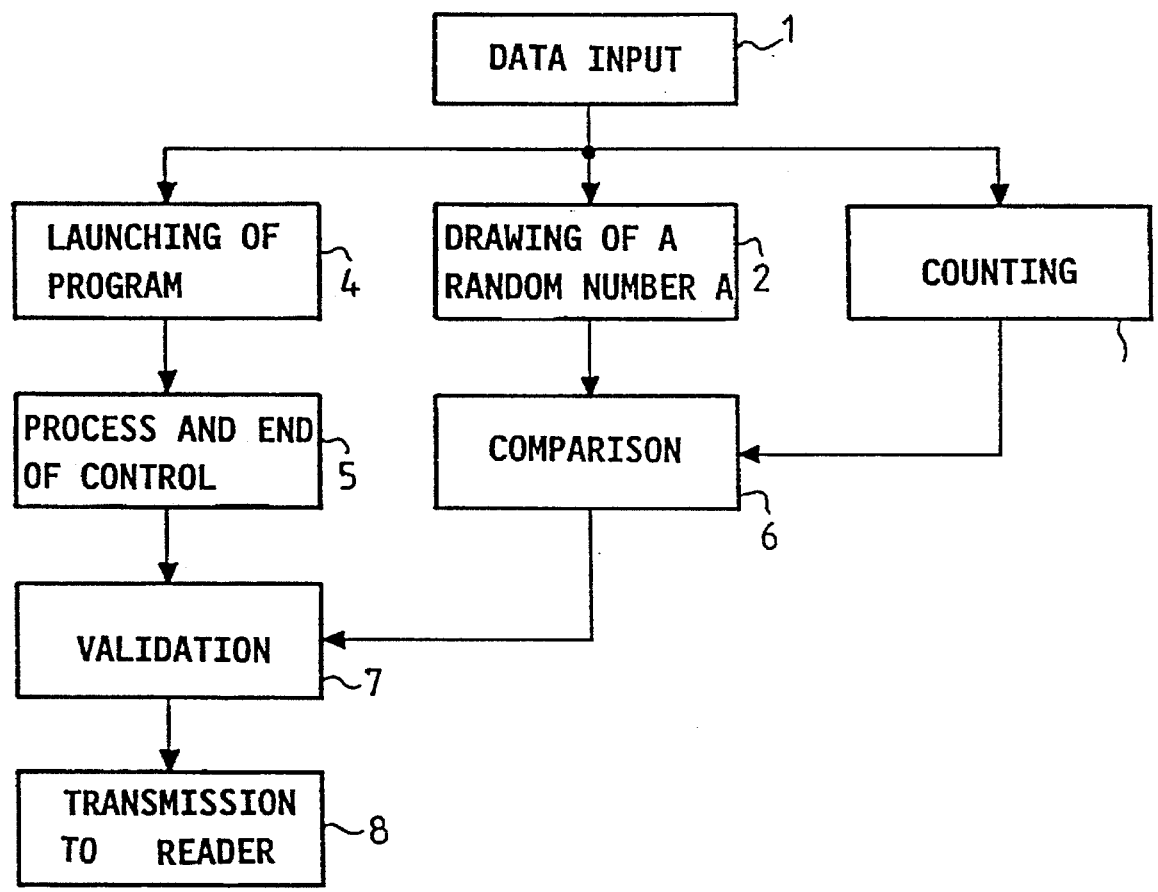
FIG_1
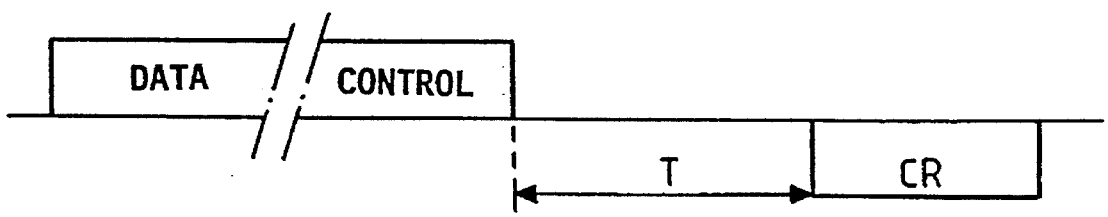
FIG_2

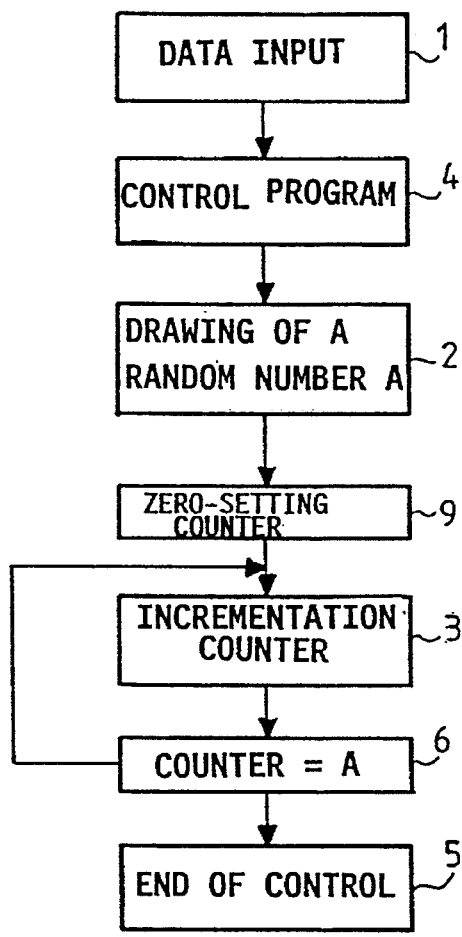
FIG_3
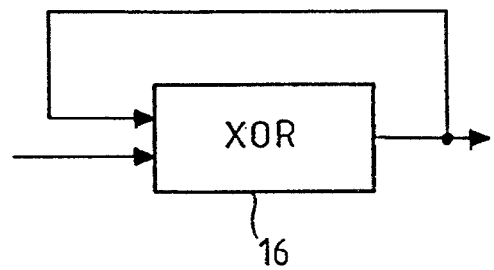
FIG_5
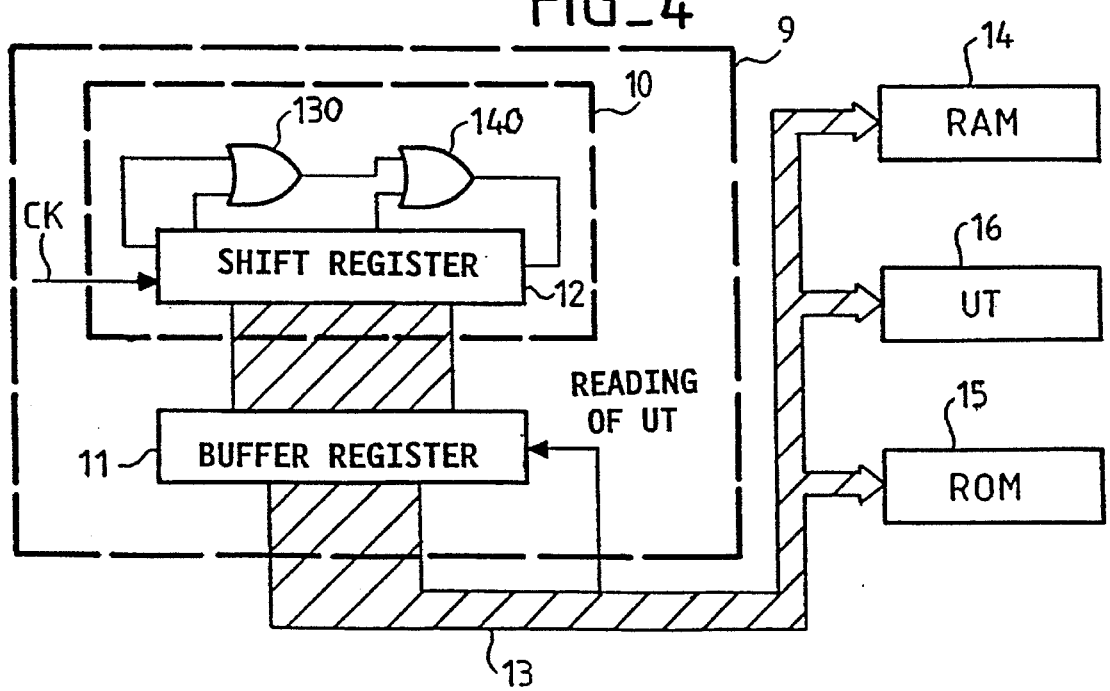
FIG_4

METHOD AND DEVICE TO INCREASE THE PROTECTION OF A CHIP CARD

This application is a continuation, of Ser. No. 07/773,448 filed on Oct. 9, 1991, now abandoned.

BACKGROUND OF THE INVENTION

1. Field of the Invention

The present invention relates to a method and device to increase the protection of a chip or memory card.

It is especially applicable to the making of microcircuit-based cards known as chip cards, used chiefly in fields where access to information or to services is strictly controlled.

These are, in particular, credit cards in the field of banking, electronic badges used for subscriber television and for the distribution of gasoline and fuel, electronic cards providing access to the telephone system or again electronic cards providing access to certain data banks.

2. Description of the Prior Art

In its broadest definition, a memory card has a storage device and a processing element formed by a microprocessor or any equivalent device, coupled to each other by a data and/or address bus that also connects the microcircuit thus formed to writing and reading devices external to the card. The storage device generally includes a ROM or EPROM type non-volatile memory in which microprograms needed for the working of the processing element are recorded and, as the case may be, it includes a RAM type volatile memory for the memorizing of the data and the instructions specific to the application reserved to the memory card. In the non-volatile memory there are also stored, firstly, the secret code identifying the bearer of the card with, if necessary, a ciphering program for the obtaining of a signature computed on the basis of the secret code and, secondly, instructions of the application program itself. This signature is itself loaded into the volatile memory. Since the card has, firstly, the application program and, secondly, a ciphering algorithm identical to the one with which the signature has been prepared, it is enough, at each use, to ascertain that the new computation of the signature, on the basis of the instructions of the program and of the secret code, is truly equal to the signature that has been already recorded.

Although the nature of memory cards made in this way is such that it is difficult for them to be used by a fraudulent individual, the user is generally allowed to make only a limited number of attempts to use his secret code in order to obtain access, with his card, to the services or information that he is seeking. Once this number of attempts is over, the card is generally confiscated. This safety arrangement, which has the effect of protecting bearers of cards and providers of services against ill-intentioned users, proves to be inefficient when these ill-intentioned users possess improved electronic means enabling them to discover the secret codes enclosed in the cards as well as their different functions. For, it is indeed possible, by examining the responses given by the processing unit of the card to the different external demands made on it, to discover not only the secret code enclosed in the cards but also the functions of the application program itself which is stored in the card. After each tabulation of a secret code, permission to have access to a service requested by a card-holder is generally given after the reception of an end-of-control message which is issued by the card after a ratification procedure, within a predetermined time limit following each attempt. However, this end-of-control message is given within a period that varies according to whether the attempt has been successful or not. This operation thus leaves fraudulent persons, having sophisticated means, with the possibility of finding the secret codes by methodically trying out every possible code for example, and noting down the time taken by the card to emit the end-of-control message each time they present the card. At present, the time needed to obtain an end-of-control message is about 200 ms when the secret code is correct, and it is about 180 ms when the code is not correct. Naturally, a solution to this problem can be found by making the time taken for the end-of-control message equal to 200 ms in both cases. However, this is not desirable in the applications themselves as it dictates the writing, in the program memories, of codes that consume more memory space. And, above all, such a condition would be almost impossible to achieve in practice as the durations of the program phases up to the end-of-control stage vary greatly: this is because the number of program steps varies in each case.

The above observations also apply to other functions of the application program stored in the card whenever the execution of one of these functions calls for the sending back of an acknowledgment in the form of an end-of-control signal. In this case, a pirate who knows the specific periods of time taken by a card to respond to control signals relating to an application would have no difficulty in re-creating the corresponding application program.

The aim of the invention is to overcome the above-mentioned drawbacks.

SUMMARY OF THE INVENTION

To this effect, an object of the invention is to provide a method to increase the protection of a microcircuit-based memory card comprising at least one memory coupled to a data-processing element wherein, when said data-processing element receives a command by a data signal external to the card, said method consists in making said data-processing element emit an end-of-control signal at an instant that is deferred, with respect to the instant at which its emission was prompted by the data signal applied to the card, by a duration that is randomly variable in time.

Another object of the invention is to provide a device for the implementation of the above-mentioned method.

BRIEF DESCRIPTION OF THE DRAWINGS

Other features and advantages of the invention shall appear here below, from the following description, made with reference to the appended drawings, of which:

FIG. 1 shows a first mode of execution of the method according to the invention in the form of a flow chart;

FIG. 2 shows a timing diagram illustrating the method of FIG. 1;

FIG. 3 shows a second mode of execution of the method according to the invention;

FIG. 4 shows a first embodiment of a circuit for the implementation of the method according to the invention;

FIG. 5 shows a logic type implementation of the method according to the invention.

DETAILED DESCRIPTION OF THE INVENTION

According to the method of the invention, the steps 1 to 7 of which are shown schematically in FIG. 1 are carried out. At step 1 data or commands are received by the microcircuit of the memory card. At steps 2 and 3 respectively, a random number A is drawn and pulses given continuously by a fixed clock (not shown) are counted in known way. Simultaneously, a program corresponding to the data and/or to the corresponding command is launched at step 4 to carry out operations for writing, reading the memory of the card and/or for example computing a signature. At the end of the execution of these instructions, the program emits an end-of-control signal or acknowledgment signal at step 5. At step 6, a comparison is made between the random number drawn at step 2 and the count made at step 3. When the number indicated by the count at step 3 is equal to the random number obtained at step 6, the end-of-control signal emitted at step 5 is validated at step 7. Then, at step 8, this signal is sent out of the card into a card reading/writing device (not shown). In this way, as can be seen in the diagram of FIG. 2, whenever a data element or command is sent to the card, the card can emit an end-of-control or acknowledgment signal CR acknowledging receipt of the data and commands that it has received after a period of time T. The duration of this time T, which is always random, can never provide information on the particular type of function that the card has been made to perform.

Naturally, the mode of execution of the method just described is not the only possible one, and other variants are possible by modifying, for example, the order or the content of steps 1 to 8, as can be seen in FIG. 3 where elements homologous to those of FIG. 1 are shown with the same references. In FIG. 3, the drawing of the random number A takes place at the step 2, not as in FIG. 1 as soon as the execution of the data input step 1 has ended but during or at the end of execution of the control program at step 4. Furthermore, the initialization of the counting at step 3 takes place not as soon as the execution of step 1 has ended but when the random number A has been drawn at the step 2. As in FIG. 1, incrementation of the counting at step 3 takes place for as long as the counting at step 6 has not reached the value of the random number A.

An embodiment of a circuit 19 for the implementation of the above method and its interconnection with the elements forming a memory card are shown in FIG. 4. The circuit 19 has a random code generator shown within a box of dashed lines 10. The parallel outputs of the generator 10 are connected to the parallel inputs of a buffer register 11. In the example of FIG. 4, the random code generator has, in a known way, a shift register 12 with outputs looped to inputs through exclusive-OR circuits 130, 140.

The connection of the circuit 19 to the other elements which, in a standard way, form a memory card, is done by means of the data bus 13 of these cards which connect RAM type memories 14 and ROM or EPROM type memories 15 to their processing unit 16. The connection to the data bus 13 takes place through the outputs of the buffer register 11.

To execute the method according to the invention, the shift register 12 is preferably controlled at the rate of a clock signal CK which is different from the clock signal used to determine the processing cycles of the processing unit 16. When, as shown in FIG. 3, the processing unit 16 carries out the control program 4 to draw the random number A, a reading signal UT of the processing unit 16 is applied to a control input of the buffer register 11 to hold the drawn random number A in the register and provide for its transfer to the bus 13. It must be noted that, according to this approach, the clock signal CK may be made variable, notably as a function of the temperature and of the supply voltages of the card so as to also have a random character.

Naturally, the embodiment of the circuit 19 that has just been described is not the only possible one. If necessary, a purely logic type embodiment may be preferred, with the implementation of a logic exclusive-OR function XOR as represented schematically in FIG. 5 by an equivalent exclusive OR gate 19. The output of the exclusive OR gate is looped to a first input, and the second input receives for example the value of the data transmitted to the card, all or a part of the data and instructions contained in the RAM 14, and the contents of all or a part of the ROM 15.

It must be noted that, in the cases of use of EPROM type non-volatile data memories, the above-described mechanisms for the generation of random numbers should be put into operation before any operation for the writing or erasure of these memories, for the fact of writing in these memories may cause variation in the voltage and/or the intensity of the supply current in a manner that is sufficiently significant to provide references for time measurements.

What is claimed is:

1. A memory card, said memory card comprising:

a bus, said bus permitting communication between an external device and said memory card;

a first memory, said first memory being coupled to said bus, and said first memory having an application program stored therein;

a second memory, said second memory being coupled to said bus;

a circuit for generating a random delay value, said circuit being coupled to said bus; and a processing element, said processing element being coupled to said bus, and said processing element defining means for receiving instructions from said application program via said bus, for executing said application program instructions, for transmitting data via said bus to said second memory for storage therein, for receiving said random delay value via said bus, and for delaying transmission of an end-of-control signal from said memory card to said external device by an amount of time proportional to said random delay value.

2. The memory card as in claim 1, wherein said random number circuit further comprises:

a random code generator, said random code generator including
a shift register, said shift register having inputs and outputs, and said shift register being controlled by a clock signal, and
a plurality of exclusive-OR circuits, said exclusive-OR circuits connecting said outputs of said shift register to said inputs of said shift register; and a buffer register, said buffer register connecting said random code generator to said bus.

3. The memory card as in claim 1, wherein said first memory is read only memory and wherein said second memory is random access memory.

4. The memory card as in claim 1, wherein said first memory is volatile memory, and wherein said second memory is nonvolatile memory.

5. A method to increase the security of a micro-circuit based chip card having a memory, and a data processing element receiving a data signal command from an external device, the method comprising the steps of:

generating a random delay value following receipt of said data signal command;

triggering a delay count to initiate a time interval;

generating an end-of-control signal;

incrementing said delay count;

comparing said random delay value to said delay count; and transmitting said end-of-control signal when said delay count is equal to said random delay value.

6. The method set forth in claim 5 wherein the randomly generated value is generated by random code generation.

7. The method as in claim 5, wherein said triggering step occurs after said data processing element receives said data signal command from said external device, and wherein said triggering step occurs before said generating step.

8. The method as in claim 5, wherein said triggering step occurs after said generating step and before said incrementing step.

* * * * *